July 15, 1958
J. L. WILLIAMS
2,842,855
ADJUSTABLE PIN GAUGE WITH LOCKING DEVICE
Filed Nov. 26, 1954
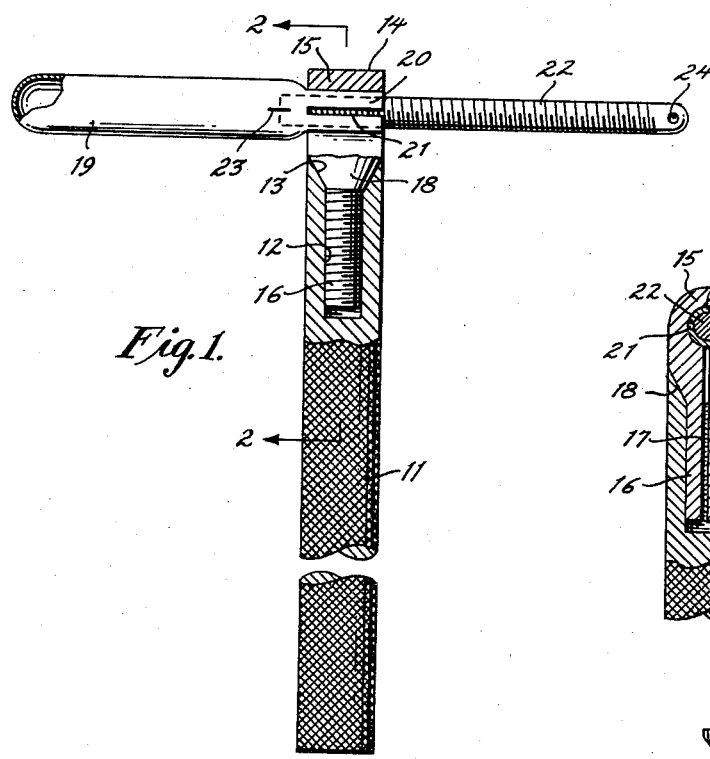
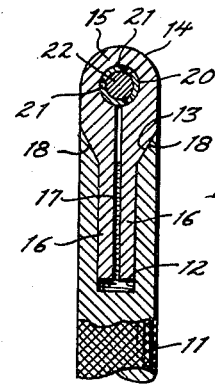
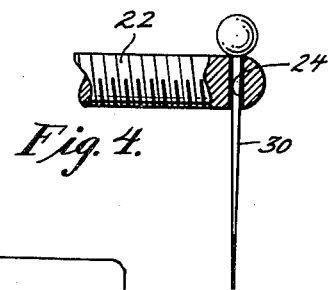
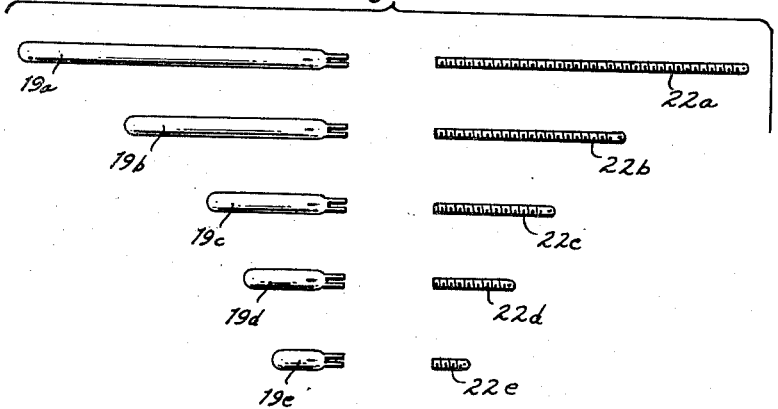
INVENTOR.
JOHN L. WILLIAMS
BY
ATTORNEY.

United States Patent Office 2,842,855
Patented July 15, 1958

2,842,855
ADJUSTABLE PIN GAUGE WITH LOCKING DEVICE

John L. Williams, Philadelphia, Pa.

Application November 26, 1954, Serial No. 471,482

1 Claim. (Cl. 33—163)

This invention relates to gauge devices, and more particularly to an improved adjustable pin gauge for use in checking the I. D. size of holes, recesses and the like.

A main object of the invention is to provide a novel and improved adjustable pin gauge for use in checking the I. D. size, holes, counterbores and the like, said pin gauge being very simple in construction, involving only a few parts, and being very easy to operate.

A further object of the invention is to provide an improved adjustable pin gauge for use by tool makers, machinists, and similar artisans, to determine the I. D. size or to check the I. D. size, hole, counterbore, or the like, the improved pin gauge being very inexpensive to manufacture, being adapted to provide measurements over a wide range of I. D. size, and being very sturdy in construction.

Further objects and advantages of the invention will become apparent from the following description and claim, and from the accompanying drawings, wherein:

Figure 1 is a side elevational view, partly in cross-section, of an improved pin gauge constructed in accordance with the present invention;

Figure 2 is a cross-sectional detail view taken on line 2—2 of Figure 1;

Figure 3 is a view showing a set of various sizes of cap elements and feeler screws adapted to be employed in the pin gauge of the present invention for providing a wide range of measurements; and Figure 4 is an enlarged fragmentary view of certain parts of the apparatus shown in Figure 1, with a pin attached thereto.

Referring to the drawings, 11 designates a straight rod-like handle member of cylindrical cross-section, formed at its top end with an axial, tapped bore 12 having the upward flaring inner rim surface 13. Designated at 14 is an eye member comprising an eye portion 15 and the depending, spaced leg segments 16, 16 integral with said eye portion and separated by a gap 17 extending to the eye of the eye portion 15. The segments 16, 16 are externally threaded to define a screw which is threadedly engageable in the recess 12, as shown in Figures 1 and 2. The segments 16, 16 are formed above their threaded portions with inclined shoulder elements 18, 18 which are wedgingly engageable in the upwardly flaring rim portion 13 of the handle member 11. The shoulder portions 18, 18 are conically formed so as to be snugly received in the conical seat 13. However, as the handle member 11 is rotated relative to the eye member 14, the shoulder portions 18, 18 wedgingly engage in the conical seat 13 and contract the eye portion 15.

Designated at 19 is an elongated hollow cap member formed with a reduced neck portion 20, said neck portion being formed with a plurality of longitudinal slots 21, as shown in Figures 1 and 2, whereby the neck portion is rendered substantially flexible. The reduced neck portion 20 is internally threaded and threadedly receives a feeler rod, for example, the rod 22 shown in Figure 1. Rod 22 may be adjusted to any desired length of extension with respect to handle 11, and may then be clamped in this adjusted position by rotating the handle 11, causing the segments 16, 16 of the eye member 14 to be squeezed together, whereby the eye portion 15 clamps the neck portion 20 and rigidly locks the feeler rod 22 in its adjusted position. As shown in Figure 1, cap member 19 is secured at right angles with respect to handle member 11, and the feeler rod 22 also extends at right angles to said handle member. Cap member 19 is inscribed with a longitudinal index mark 23, and the tip of the feeler rod 22 is provided with an index hole 24, whereby the degree of rotation of feeler rod 22 with respect to cap member 19 may be determined by noting the position of the index hole 24 with respect to the index mark 23. To facilitate rotation and indexing of the feeler rod, a pin 30 or a small piece of stiff wire may be placed in hole 24, as shown in Figure 4.

Figure 3 illustrates a set of elongated cap members of varying lengths, as shown at 19a to 19e which are adapted to receive the respective feeler rods 22a to 22e, to provide a wide variation of ranges of I. D. size measurements for which the device may be employed, merely by inserting the appropriate cap member in the eye portion 15 and employing the appropriate feeler rod with said cap member. The feeler rod 22 may be suitably calibrated or may be employed merely as an ordinary gauge device. For example, if it is desired to bore a hole of a desired size, the hole is first bored to an I. D. size slightly less than the desired I. D. size and then measured with an ordinary rule or caliper. The pin gauge device of the present invention is then adjusted to the I. D. size of the hole, that is, the feeler rod 22 is set so that its distance of extension with respect to the end of the cap member 19 is exactly the same as the I. D. size of the hole, and then the feeler rod 22 is locked by rotating the handle 11 in the manner above described. The length of extension of the feeler member 22 is then measured by a micrometer, and the difference between the measured length of the feeler member 22 and the desired I. D. size of hole is determined. This value is the amount which the cutting tool must be advanced to complete the formation of the desired hole.

While a specific embodiment of an improved adjustable I. D. size gauge device has been disclosed in the foregoing description, it will be understood that various modifications within the spirit of the invention may occur to those skilled in the art. Therefore, it is intended that no limitations be placed on the invention except as defined by the scope of the appended claim.

What is claimed is:

A gage comprising, in combination, an eye member having a central opening and a longitudinally split shank defining opposing shank segments, said shank segments communicating with said central opening, a first elongated member having an open longitudinally bifurcated and internally threaded neck, said central opening of said eye receiving said neck, a second elongated member having one end threadingly engaged within said threaded neck of said first member, and indicia means at the outer end of said second member independently indicating changes in the longitudinal relationship between said first and second elongated members in response to relative rotation between said first and second elongated members, said indicia means comprising a bore extending transversely through said outer end of said second member, and an element extending through said transverse bore and extending outwardly therebeyond.

References Cited in the file of this patent

UNITED STATES PATENTS

| | | |
|---|---|---|
| 1,385,405 | Tangen | July 26, 1921 |
| 2,353,297 | Donath | July 11, 1944 |